United States Patent
Verma

(10) Patent No.: US 11,943,227 B2
(45) Date of Patent: Mar. 26, 2024

(54) DATA ACCESS CONTROL FOR AUGMENTED REALITY DEVICES

(71) Applicant: Bank of America Corporation, Charlotte, NC (US)

(72) Inventor: Sandeep Verma, Gurugram (IN)

(73) Assignee: Bank of America Corporation, Charlotte, NC (US)

( * ) Notice: Subject to any disclaimer, the term of this patent is extended or adjusted under 35 U.S.C. 154(b) by 363 days.

(21) Appl. No.: 17/448,021

(22) Filed: Sep. 17, 2021

(65) Prior Publication Data

US 2023/0089622 A1    Mar. 23, 2023

(51) Int. Cl.
| | |
|---|---|
| H04L 9/40 | (2022.01) |
| G06F 3/01 | (2006.01) |
| G06F 16/955 | (2019.01) |
| G06F 40/134 | (2020.01) |
| G06F 40/174 | (2020.01) |
| G06T 11/00 | (2006.01) |

(52) U.S. Cl.
CPC ............ *H04L 63/102* (2013.01); *G06F 3/011* (2013.01); *G06F 3/017* (2013.01); *G06F 16/9558* (2019.01); *G06F 40/134* (2020.01); *G06F 40/174* (2020.01); *G06T 11/00* (2013.01)

(58) Field of Classification Search
CPC ..... H04L 63/102; H04L 63/168; H04L 63/10; G06F 3/011; G06F 3/017; G06F 16/9558; G06F 40/134; G06F 40/174; G06F 21/31; G06F 21/32; G06T 11/00
See application file for complete search history.

(56) References Cited

U.S. PATENT DOCUMENTS

| | | | |
|---|---|---|---|
| 5,781,913 | A | 7/1998 | Felsenstein et al. |
| 6,032,162 | A | 2/2000 | Burke |
| 6,041,360 | A | 3/2000 | Himmel et al. |
| 6,172,657 | B1 | 1/2001 | Kamakura et al. |
| 6,208,995 | B1 | 3/2001 | Himmel et al. |
| 6,393,462 | B1 | 5/2002 | Mullen-Schultz |
| 6,427,175 | B1 | 7/2002 | Khan et al. |
| 7,100,114 | B1 | 8/2006 | Burleson |
| 7,165,220 | B1 | 1/2007 | Bates et al. |
| 7,184,758 | B2 | 2/2007 | Corneliussen et al. |
| 7,215,322 | B2 | 5/2007 | Genc et al. |
| 8,041,763 | B2 | 10/2011 | Kordun et al. |

(Continued)

FOREIGN PATENT DOCUMENTS

| | | |
|---|---|---|
| EP | 1022666 A2 | 7/2000 |
| EP | 2996015 A1 | 3/2016 |

(Continued)

*Primary Examiner* — Mohammad W Reza

(57) ABSTRACT

A device configured to receive an access request for a website from an augmented reality device. The device is further configured to determine a user associated with the augmented reality device is authorized to access the website based on user credentials and to identify a user profile for the user associated with the user credentials. The device is further configured to identify information for flagged web pages that are associated with the website within the user profile and to generate a virtual environment with virtual objects that represent the flagged web pages. The device is further configured to provide access to the virtual environment for the augmented reality device.

20 Claims, 6 Drawing Sheets

(56) References Cited

U.S. PATENT DOCUMENTS

| | | |
|---|---|---|
| 8,266,244 B2 | 7/2012 | Ahn et al. |
| 8,275,856 B2 | 9/2012 | Schneider |
| 8,448,075 B2 | 5/2013 | Wu |
| 8,533,199 B2 | 9/2013 | Malla |
| 8,589,782 B2 | 11/2013 | Schachter |
| 8,671,384 B2 | 3/2014 | Hilerio et al. |
| 8,797,357 B2 | 8/2014 | Kim et al. |
| 9,105,126 B2 | 8/2015 | Fein et al. |
| 9,111,383 B2 | 8/2015 | Fein et al. |
| 9,141,188 B2 | 9/2015 | Fein et al. |
| 9,286,407 B2 | 3/2016 | Curwen et al. |
| 9,792,594 B1 | 10/2017 | Bayha et al. |
| 9,928,221 B1 | 3/2018 | Freund et al. |
| 10,311,646 B1 | 6/2019 | Wurmfeld et al. |
| 11,024,092 B2 | 6/2021 | Harviainen |
| 11,094,220 B2 | 8/2021 | Tan et al. |
| 2002/0067372 A1 | 6/2002 | Friedrich et al. |
| 2005/0210297 A1 | 9/2005 | Wu et al. |
| 2005/0246622 A1 | 11/2005 | Ahn et al. |
| 2006/0150094 A1 | 7/2006 | Patrawala |
| 2011/0276889 A1 | 11/2011 | Boshernitzan |
| 2011/0307738 A1 | 12/2011 | Hilerio et al. |
| 2012/0327119 A1 | 12/2012 | Woo et al. |
| 2013/0290876 A1 | 10/2013 | Anderson et al. |
| 2013/0311497 A1 | 11/2013 | Jang |
| 2013/0314443 A1 | 11/2013 | Grassick |
| 2014/0267406 A1 | 9/2014 | Mullins |
| 2016/0004306 A1 | 1/2016 | Maltz |
| 2016/0171767 A1 | 6/2016 | Anderson |
| 2017/0286392 A1 | 10/2017 | Wang |
| 2018/0047196 A1 | 2/2018 | Du |
| 2019/0238635 A1 | 8/2019 | Ng et al. |
| 2023/0089622 A1* | 3/2023 | Verma .................. G06F 40/134 726/4 |
| 2023/0326360 A1* | 10/2023 | Grube .................... G06T 17/00 |

FOREIGN PATENT DOCUMENTS

| | | |
|---|---|---|
| EP | 3736668 A1 | 11/2020 |
| WO | 2012049674 A3 | 4/2013 |
| WO | 2016053228 A1 | 4/2016 |
| WO | 2018031949 A1 | 2/2018 |

* cited by examiner

DATA ACCESS CONTROL FOR AUGMENTED REALITY DEVICES

TECHNICAL FIELD

The present disclosure relates generally to information security, and more specifically to data access control for augmented reality devices.

BACKGROUND

In a network environment, user devices are in data communication with other devices that may be distributed anywhere in the world. These network environments allow data and information to be shared among devices. Some of the technical challenges that occur when data is exchanged between devices are controlling data leakage, unauthorized access to data, and preventing malicious activities. Data storing devices, such as user devices, databases, and servers, are vulnerable to attacks. This vulnerability poses several network security challenges. Existing systems are typically unable to detect a network attack until after the attack has occurred. For example, a bad actor may upload malicious files to a device which then allows the bad actor to gain unauthorized access to other files or documents that are also stored in the device. Having a delayed response allows the bad actor to gain access to sensitive information within the network and allows bad actors to perform other malicious activities such as data exfiltration or uploading malware.

SUMMARY

The disclosed system provides several practical applications and technical advantages that overcome the previously discussed technical problems. For example, the disclosed system provides a practical application by enabling a process that allows a user to interact with web pages using a user device (e.g. a mobile device), to store the current state of the web pages, and then later to securely access the web pages in their saved state using an augmented reality device. This process generally involves authenticating a user on their user device before allowing the user to access a website and then storing information for any web pages that the user flags for accessing in the future using an augmented reality device. At a later time, the user can authenticate themselves again using the augmented reality device to resume interacting with the flagged web pages. The state of the flagged web pages is the same as when the user was previously interacting with the web pages on their user device. For example, a web page may be preloaded with filter settings that customize the appearance of the web page and/or user inputs that are entered into data fields within the web page. This process improves information security for an information system by providing a secure way to store and transfer sensitive user information between a user device and an augmented reality device.

Improving information security for the information system also improves the underlying network and the devices within the network. For example, when a data exfiltration attack occurs, there is an increase in the number of network resources and bandwidth that are consumed which reduces the throughput of the network. By preventing data exfiltration attacks, the system can prevent any unnecessary increases in the number of network resources and bandwidth that are consumed that would otherwise negatively impact the throughput of the system. As another example, when a malware attack occurs, one or more devices may be taken out of service until the malware can be removed from the devices. Taking devices out of service negatively impacts the performance and throughput of the network because the network has fewer resources for processing and communicating data. By preventing malware types of attacks, the system prevents any comprised devices from being taken out of service due to an attack that would otherwise negatively impact the performance and throughput of the network.

In addition, conventional systems only allow a user to bookmark or save the location of a web page. However, bookmarking a web page does not preserve any of the user inputs or settings that were applied by the user. This means that the user will have to reenter user inputs and reapply settings manually each time they access a bookmarked web page. In contrast, the disclosed system provides a technical advantage by allowing the user to preserve and recover the state of a web page that the user was previously interacting with. This means that any user inputs or settings that were previously applied by the user to a web page will automatically be reapplied when the user accesses the web page using an augmented reality device. This means that the user will spend less time occupying network resources since they do not have to reapply all of their inputs and settings before they can access the information that they need. By reducing the amount of time that the user has to occupy network resources, this process improves network and resource utilization which in turn improves the overall operation of the information system.

In addition, user devices typically rely on two-dimensional graphical user interfaces to display information to a user. Using conventional two-dimensional graphical user interfaces to display information creates several technical problems and limitations that are inherent to existing display technology. For example, existing two-dimensional graphical user interfaces limit the amount of information the user can see based on the size of the display. The user may also have to interact with multiple windows or screens on the graphical user interface to view all information on which the user is interested. Using existing graphical user interfaces and having to interact with multiple windows or screens causes a disconnect between the information being presented. In contrast, the disclosed system provides another technical advantage by allowing the user to view and interact with previously saved information using a virtual environment and an augmented reality device. Conventional displays have physical constraints, such as screen sizes, that limit the amount of information that can be present to the user at once time. The disclosed system provides a virtual environment that has a three-hundred and sixty-degree field of view for the user to view information. This virtual environment surrounds the user and allows the user to view different sections of the virtual environment by turning their head. This virtual environment removes the physical constraints of conventional displays, and thereby, provides a technical improvement to the information system.

In one embodiment, the information system comprises a device that is configured to receive an access request for a website from an augmented reality device. The device is further configured to determine whether a user that is associated with the augmented reality device is authorized to access the website based on their user credentials. In response to determining that the user is authorized to access the website, the device is further configured to identify a user profile for the user that is associated with the user credentials. The device is further configured to identify information for any flagged web pages that are associated with the website within the identified user profile. The information for the flagged web pages may include an identifier for a flagged web page, an address for a flagged web page, filter settings, user inputs, or any other suitable type of information for a flagged web page. The device is further configured to generate a virtual environment with virtual objects that represent the flagged web pages and to provide access to the virtual environment for the augmented reality device.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

System Overview

Figure 1:
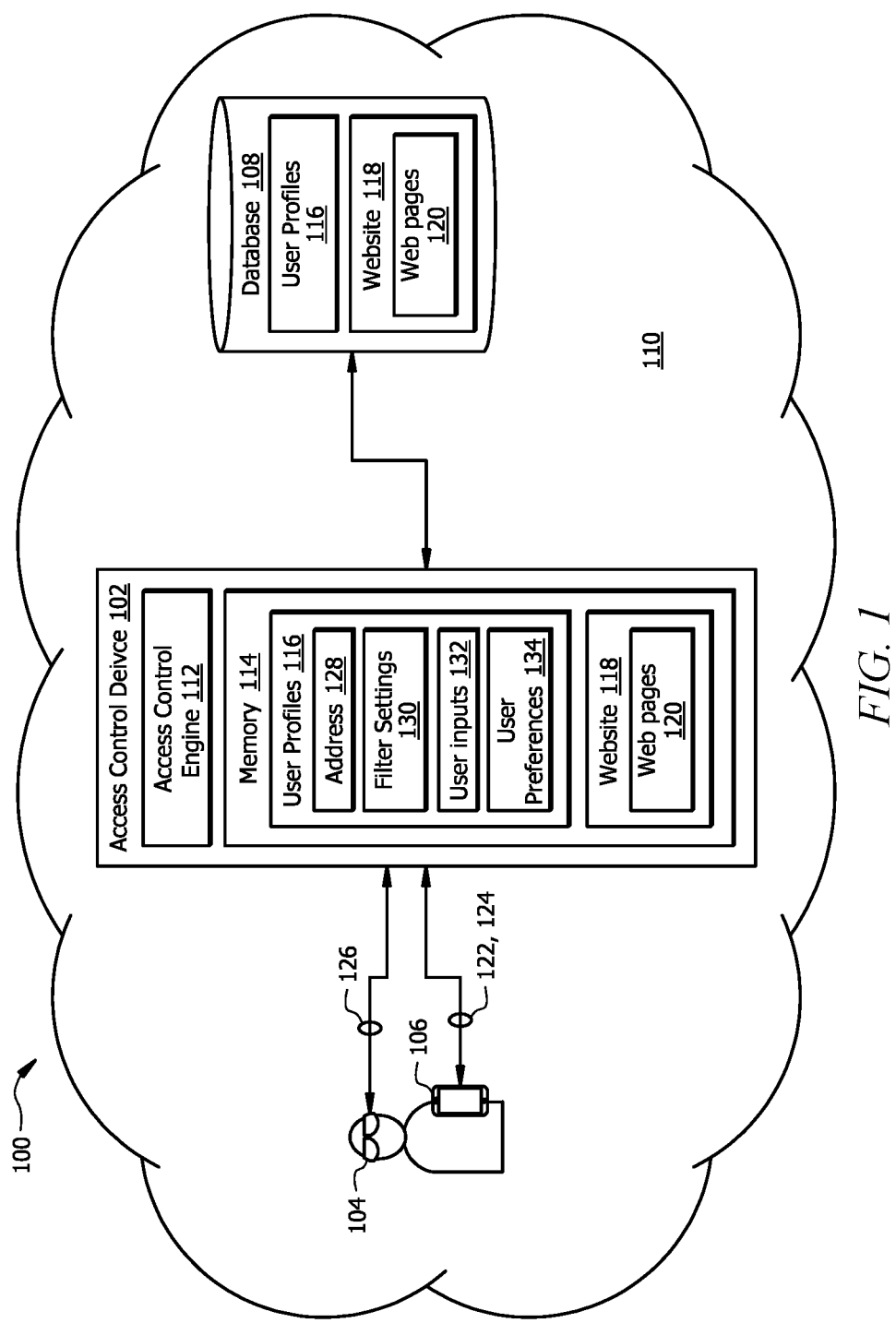
FIG. 1 is a schematic diagram of an embodiment of an information system that is configured to employ data access control for augmented reality devices.

FIG. 1 is a schematic diagram of an embodiment of an information system 100 that is generally configured to allow a user to interact with web pages using a user device 106 (e.g. a mobile device), to store the current state of one or more web pages 120, and then later to securely access the web pages 120 in their saved state using an augmented reality device 104. This process generally involves authenticating a user on their user device 106 before allowing the user to access a website 118 and then storing information for any flagged web pages 120 from the website 118 that the user would like to access in the future using an augmented reality device 104. At a later time, the user authenticates themselves again using the augmented reality device 104 to resume interacting with the flagged web pages 120. The state of the flagged web pages 120 is the same as when the user was previously interacting with the web pages 120 on the user device 106. For example, a web page 120 may be preloaded with filter settings 130 that affect the appearance of the web page 120 or user inputs 132 that are applied to data fields within the web page 120. This process improves information security for an information system 100 by providing a secure way to store and transfer sensitive user information between a user device and an augmented reality device. The information system 100 also provides a technical advantage by allowing the user to preserve and recover the state of a web page 120 that the user was previously interacting with. This means that any user inputs 132 or settings that were previously applied by the user to a web page 120 will automatically be reapplied when the user accesses the web page 120 using the augmented reality device 104. This means that the user will spend less time occupying network resources since they do not have to reapply all of their inputs and settings before they can access the information that they need on the flagged web pages 120.

In one embodiment, the information system 100 comprises a plurality of user devices (e.g. augmented reality device 104 and user device 106), an access control device 102, and a database 108 that are in signal communication with each other within a network 110. The access control device 102 may also be in signal communication with other network devices within the network 110. The network 110 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. The network 110 may be configured to support any suitable type of communication protocol as would be appreciated by one of ordinary skill in the art.

User Devices

The augmented reality device 104 and the user device 106 are each generally configured to provide hardware and software resources to a user. Examples of the user device 106 include, but are not limited to, a smartphone, a tablet, a laptop, a computer, a smart device, or any other suitable type of device. The user device 106 comprises a graphical user interface (e.g. a display or a touchscreen) that allows a user to view web pages 120 from a website 118 on the user device 106. The user device 106 may comprise a touchscreen, a touchpad, keys, buttons, a mouse, or any other suitable type of hardware that allows a user to provide inputs into the user device 106. The user device 106 is configured to allow the user to flag web pages 120 from a website 118 and to send information associated with the flagged web pages 120 so that the user can access the flagged web pages 120 using the augmented reality device 104. An example of this process is described in FIG. 2.

In FIG. 1, the augmented reality device 104 is configured as a head-mounted wearable device. In other examples, the augmented reality device 104 may be integrated into a contact lens structure, an eyeglass structure, a visor structure, a helmet structure, or any other suitable structure. An example of the hardware configuration of the augmented reality device 104 is described in FIG. 6. The augmented reality device 104 is configured to display the flagged web pages 120 to the user as virtual objects 402 within a virtual environment 400. For example, the augmented reality device 104 may be configured to show the flagged web pages 120 as virtual objects 402 that are overlaid onto tangible objects within a real scene that is in front of the user. As another example, the augmented reality device 104 may be configured to show the flagged web pages 120 as virtual objects 402 within a self-contained virtual environment 400. An example of this process is described in FIGS. 3 and 4.

Access Control Device

Examples of an access control device 102 include, but are not limited to, a server, an access point, a computer, or any other suitable type of network device. In one embodiment, an access control device 102 comprises an access control engine 112 and a memory 114. Additional details about the hardware configuration of the access control device 102 are described in FIG. 5. The memory 114 is configured to store user profiles 116, websites 118. web pages 120, and/or any other suitable type of data.

In one embodiment, the access control engine 112 is generally configured to allow a user to set up and update a user profile 116 using their user device 106 (e.g. a mobile device or a computer). This process generally involves allowing the user to flag web pages 120 from a website 118 and to store information associated with the flagged web pages 120 in their user profile 116. This process allows the user to later access the flagged web pages 120 using an augmented reality device 104. An example of the access control engine 112 performing this operation is described in more detail in FIG. 2. The access control engine 112 is further configured to provide the flagged web pages 120 as virtual objects 402 within a virtual environment 400 that can be displayed to the user using an augmented reality device 104. An example of the access control engine 112 performing this operation is described in more detail in FIG. 3.

The user profiles 116 generally comprises information that is associated with known and approved users for accessing websites 118 within the network 110. A website 118 comprises a plurality of web pages 120 that provide information to the user. In one embodiment, a website 118 may be configured to restrict access to information for users. For example, a user may be required to provide valid user credentials before accessing information from the website 118. In other embodiments, a website 118 may not restrict user access. In this case, any user can access the information from the website 118.

The user profiles 116 may comprise user identities, user credentials, account information, contact information, user device information, user permission settings, or any other suitable type of information that is associated with users. Examples of user identities include, but are not limited to, a name, an alphanumeric code, an employee number, an account number, a phone number, an email address, or any other suitable type of identifier that is uniquely associated with a user. Examples of user credentials include, but are not limited to, log-in credentials, a username and password, a token, a Personal Identification Number (PIN), an alphameric value, biometric information, or any other suitable type of information that can be used to verify the identity of a user.

The user profiles 116 may further comprise information that is associated with web pages 120 that were flagged by the user. The information associated with the flagged web pages 120 may comprise an address 128, filter settings 130, user inputs 132, or any other suitable type of information for the web page 120. The address 128 comprises information for locating and accessing a web page 120 from a website 118. As an example, the address 128 may comprise a Uniform Resource Location (URL) for a web page 120. The filter settings 130 comprise settings for customizing the appearance of a web page 120. As an example, the filter settings 130 may comprise inputs for filtering search results on a web page 120. As another example, the filter settings 130 may comprise inputs for modifying a layout for a web page 120. The user inputs 132 comprise information for populating data fields within a web page 120. As an example, the user inputs 132 may comprise text for filling in a data field on a web page 120. As another example, the user inputs 132 may comprise selections for a drop-down menu on a web page 120. In some embodiments, the user profile 116 may further comprise user preferences 134 for a virtual environment 400. The user preference 134 may comprise settings for visualizing virtual objects 402 within a virtual environment 400. For example, the user preferences 134 may comprise instructions or settings for arranging and scaling virtual objects 402 within the virtual environment 400.

Database

Examples of a database 108 include, but are not limited to, file repositories, computers, databases, memories, servers, shared folders, or any other suitable type of networking device. In some embodiments, the database 108 may be configured to store user profiles 116, websites 118, web pages 120, and/or any other suitable type of information that is associated with the information system 100. In this case, the access control device 102 may request information from the database 108 or store information in the database 108. In FIG. 1, the information system 100 shows a single database 108. In other embodiments, the information system 100 may comprise any other suitable number of databases 108. In some embodiments, the database 108 may be optional and omitted.

User Profile Updating Process

Figure 2:
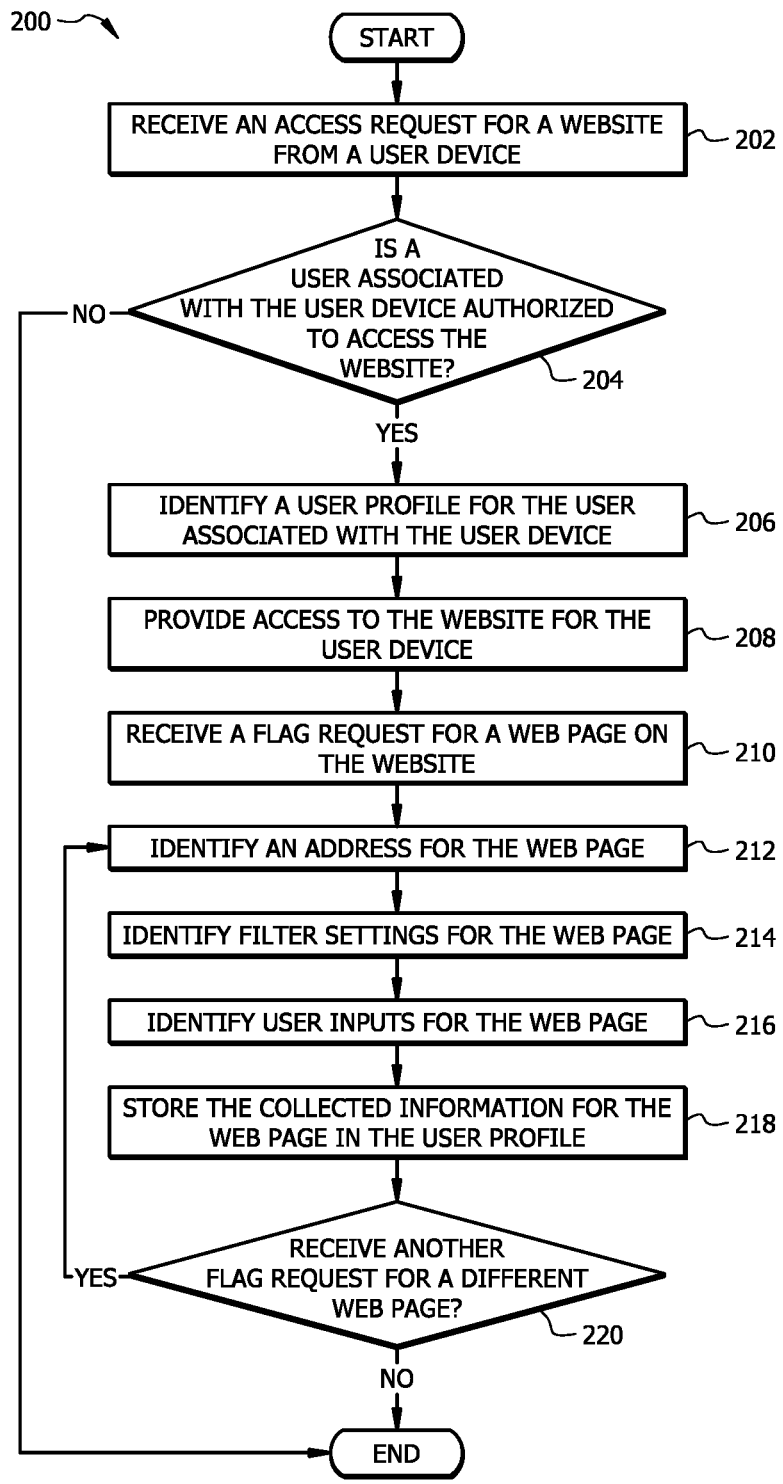
FIG. 2 is a flowchart of an embodiment of a user profile updating process for the information system.

FIG. 2 is a flowchart of an embodiment of a user profile updating process 200 for the information system 100. The information system 100 may employ process 200 to store information associated with a current state of web pages 120 that a user is interacting with using a user device 106 (e.g. a mobile device or computer). Process 200 allows the user to interact with a web page 120 and then to save the state of the web page 120 so that it can be later viewed and accessed using an augmented reality device. This process allows the user to preserve the state of the web pages 120 so that the user can resume interacting with the web pages 120 in a virtual environment 400 using an augmented reality device.

At step 202, the access control device 102 receives an access request 122 for a website 118 from a user device 106 (e.g. a mobile device). The access request 122 comprises user credentials for a user. Examples of user credentials include, but are not limited to, log-in credentials, a username and password, a token, a Personal Identification Number (PIN), an alphameric value, biometric information, or any other suitable type of information that can be used to verify the identity of a user. As an example, a user may access a landing web page 120 for the website 118 that prompts the user to enter their user credentials. In response to the user inputting their user credentials, the user device 106 sends the user credentials within an access request 122 to the access control device 102.

At step 204, the access control device 102 determines whether a user associated with the user device 106 is authorized to access the website 118. Here, the access control device 102 may compare the provided user credentials to user credentials that are stored in the user profiles 116 to determine whether there is a match. In this example, the access control device 102 may use the user credentials as a search token to determine whether a user profile 116 exists for the user. The access control device 102 determines that user credentials are valid when the access control device 102 is able to identify a user profile 116 for the user. Otherwise, the access control device 102 determines that user credentials are invalid when the access control device 102 is unable to identify a user profile 116 for the user. The access control device 102 terminates process 200 in response to determining that the user credentials are invalid. In this case, the access control device 102 determines that the user credentials are not associated with a known or approved user and terminates process 200 which prevents the user device 106 from accessing the website 118. The access control device 102 proceeds to step 206 in response to determining that the user credentials are valid. In this case, the access control device 102 determines that the user credentials are associated with an authorized user and proceeds to step 206 to identify information that is associated with the user.

At step 206, the access control device 102 identifies a user profile 116 for a user that is associated with the user device 106. Here, the access control device 102 identifies the user profile 116 that is associated with the user credentials that were provided by the user device 106 in step 202.

At step 208, the access control device 102 provides access to the website 118 for the user device 106. After determining that the user associated with the user device 106 is authorized the website 118, the access control device 102 provides access to the website 118 and its web pages 120. Each web page 120 may be configured to provide different types of information to the user. Some web pages 120 may be configured to provide general information, for example, general information about an organization and its resources. Other web pages 120 may be configured to provide personalized information for the user. For example, a web page 120 may be configured to provide account information, user history information, a personal calendar, messages, or any other suitable type of information that is personalized for the user.

At step 210, the access control device 102 receives a flag request 124 for a web page 120 on the website 118. The flag request 124 identifies the web page 120 and comprises information for the web page 120 that the user would like to make accessible via an augmented reality device 104. The flag request 124 may comprise an identifier for the web page 120, an address 128 for the web page 120, filter settings 130 for the web page 120, user inputs 132 for the web page 120, or any other suitable type of information for the web page 120. In one embodiment, the user device 106 may send the flag request 124 in response to a user performing a specific action on the web page 120. As an example, the web page 120 may comprise a button that is embedded within the web page 120 for flagging the web page 120. In this example, the user may click on the button to generate the flag request 124 for the web page 120. The web page 120 may be configured with executable code that detects when the user clicks the button and generates the flag request 124 for the web page 120. In other embodiments, the user device 106 may use any other suitable technique for generating and sending the flag request 124.

At step 212, the access control device 102 identifies an address 128 for the web page 120. Here, the access control device 102 may extract an identifier for the web page 120 and the address 128 (e.g. URL address) for accessing the web page 120.

At step 214, the access control device 102 identifies filter settings 130 for the web page 120. Here, the access control device 102 determines whether the flag request 124 comprises any filter settings 130 that were applied by the user for the web page 120. In response to determining that the flag request 124 comprises filter settings 130, the access control device 102 extracts the filter settings 130 from the flag request 124. The filter settings 130 comprise settings for customizing the appearance of the web page 120. As an example, the filter settings 130 may comprise inputs for filtering search results on a web page 120. As another example, the filter settings 130 may comprise inputs for modifying a layout for a web page 120.

At step 216, the access control device 102 identifies user inputs 132 for the web page. Here, the access control device 102 determines whether the flag request 124 comprises user inputs 132 that were entered by the user for the web page 120. In response to determining that the flag request 124 comprises user inputs 132, the access control device 102 extracts the user inputs 132 from the flag request 124. The user inputs 132 comprise information for populating data fields within a web page 120. For example, the user inputs 132 may identify one or more data fields on the web page 120 and corresponding user-defined values for each of the identified data fields. As an example, the user inputs 132 may comprise text for filling in a data field on a web page 120. As another example, the user inputs 132 may comprise selections for a drop-down menu on the web page 120.

At step 218, the access control device 102 stores the collected information for the web page 120 in the user profile 116. The access control device 102 may store an identifier for the flagged web page 120, an address 128 for the flagged web page 120, filter settings 130 for the flagged web page 120, user inputs 132 for the flagged web page 120, or any other suitable type of information for the flagged web page 120.

At step 220, the access control device 102 determines whether any other flag requests 124 have been received for other web pages 120. The access control device 102 may continue to monitor the activity of the user on the web site 118 to determine whether the sends any flag requests 124 for other web pages 120 on the website 118. The access control device 102 returns to step 212 in response to determining that a flag request 124 has been received for another web page 120. In this case, the access control device 102 returns to step 212 to collect information for the flagged web page 120 and to store the collected information in the user's user profile 116. The access control device 102 terminates process 200 in response to determining that no more flag requests have been received. In this case, the access control device 102 determines that the user has ended their session with the website 118 and that no additional information for flagged web pages 120 will be stored in the user's user profile 116.

Data Access Process

Figure 3:
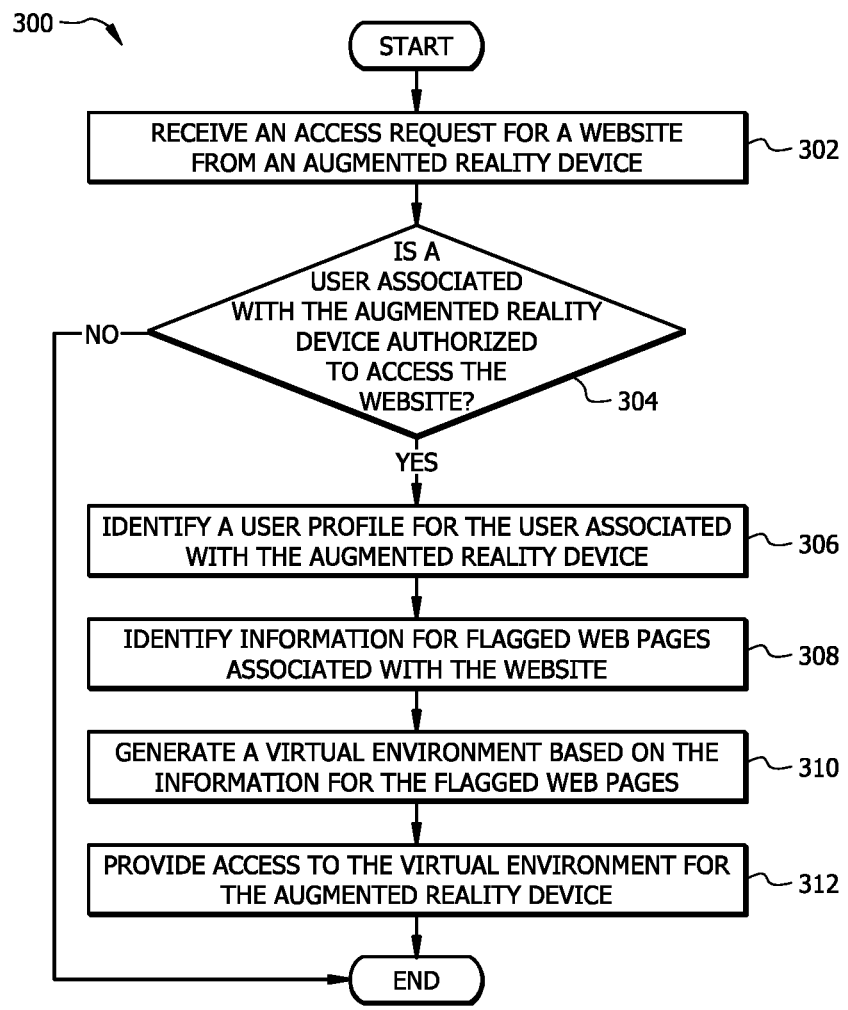
FIG. 3 is a flowchart of an embodiment of a data access process for the information system.

FIG. 3 is a flowchart of an embodiment of a data access process 300 for the information system 100. The information system 100 may employ process 300 to recover the state of a previously saved web page 120 that a user was interacting with and to present the web page 120 in its saved state within a virtual environment 400. For example, a user may have previously saved information associated with the state of web pages 120 that the user is interacting with using a process similar to process 200 that is described in FIG. 2. The information system 100 may then employ process 300 to recover the state of the previously saved web pages 120 and to present the web pages 120 as virtual objects 402 within a virtual environment 400 for an augmented reality device 104. This process allows the user to view and resume interacting with the web pages 120 in the virtual environment 400 using the augmented reality device 104.

At step 302, the access control device 102 receives an access request 126 for a website 118 from an augmented reality device 104. The access request 126 comprises user credentials for the user. The access request 126 may comprise the same user credentials that were sent by the user device 106 or different user credentials that are associated with the user. As an example, a user may access the landing web page 120 for the website 118 using the augmented reality device 104. Once again, the landing web page 120 prompts the user to enter their user credentials. In response to the user inputting their user credentials, the augmented reality device 104 sends the user credentials within an access request 122 to the access control device 102.

At step 304, the access control device 102 determines whether a user associated with the augmented reality device 104 is authorized to access the website 118. Here, the access control device 102 may compare the user credentials provided by the augmented reality device 104 to user credentials that are stored in the user profiles 116 to determine whether there is a match. In this example, the access control device 102 may use the user credentials as a search token to determine whether a user profile 116 exists for the user. The access control device 102 determines that user credentials are valid when the access control device 102 is able to identify a user profile 116 for the user. Otherwise, the access control device 102 determines that user credentials are invalid when the access control device 102 is unable to identify a user profile 116 for the user. The access control device 102 terminates process 300 in response to determining that the user credentials are invalid. In this case, the access control device 102 determines that the user credentials are not associated with a known or approved user and terminates process 300 which prevents the augmented reality device 104 from accessing the website 118. The access control device 102 proceeds to step 306 in response to determining that the user credentials are valid. In this case, the access control device 102 determines that the user credentials are associated with an authorized user and proceeds to step 306 to identify information that is associated with the user.

At step 306, the access control device 102 identifies the user profile 116 for the user that is associated with the augmented reality device 104. Here, the access control device 102 identifies the user profile 116 that is associated with the user credentials that were provided by the augmented reality device 104 in step 302.

At step 308, the access control device 102 identifies information for any flagged web pages 120 that are associated with the website 118 from the user profile 116. The information for the flagged web pages 120 may comprise an identifier for a flagged web page 120, an address 128 for a flagged web page 120, filter settings 130 for a flagged web page 120, user inputs 132 for a flagged web page 120, or any other suitable type of information for a flagged web page 120.

Figure 4:
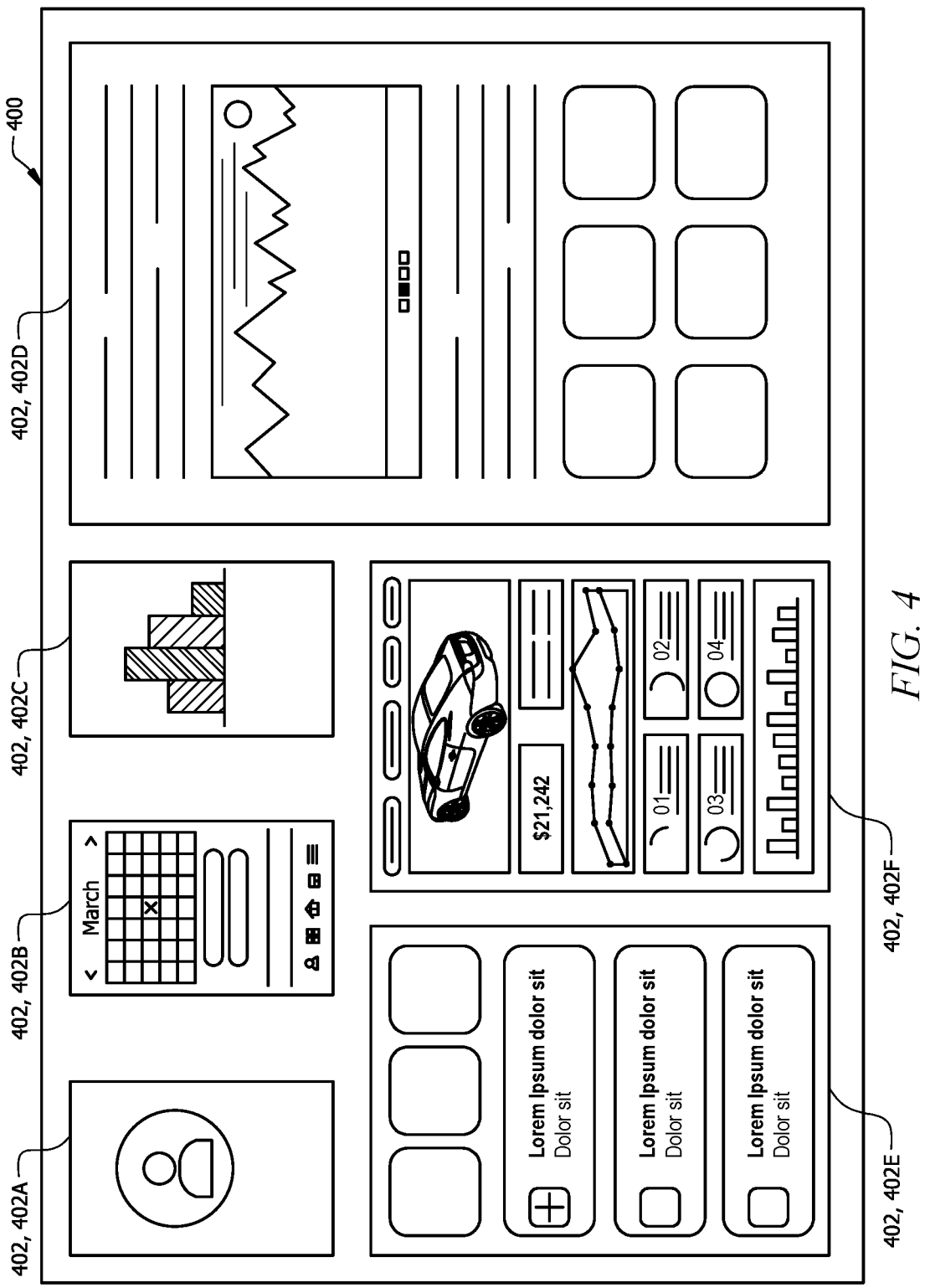
FIG. 4 is an example of a virtual environment for an augmented reality device.

At step 310, the access control device 102 generates a virtual environment 400 based on the identified information for the flagged web pages 120. An example of a virtual environment 400 is shown in FIG. 4. The virtual environment 400 comprises a plurality of virtual objects 402. In this example, the virtual environment 400 comprises a virtual object 402A for a web page 120 with a user profile, a virtual object 402B for a web page 120 with a calendar, a virtual object 402C for a web page 120 with charts, a virtual object 402D for a web page 120 with general information, a virtual object 402E for a web page 120 with navigation tools, and a virtual object 402F for a web page 120 with graphical information. Each of the flagged web pages 120 may be converted into a virtual object 402 using the process described below. The virtual objects 402 can be positioned and scaled based on the user's preferences. The virtual objects 402 can also be repositioned and resealed any time by the user using hand gestures. Additional details about this process are described below in step 312. In this example, each virtual object 402 comprises a screenshot of a flagged web page 120 in a configuration that was previously saved by the user. This process allows the user to quickly identify flagged web pages 120 and to resume interacting with the flagged web pages 120. Conventional displays have physical constraints (e.g. screen sizes) that limit the amount of information that can be present to a user at once time. In contrast, the virtual environment 400 provides a three-hundred and sixty-degree field of view for viewing virtual objects 402. This provides a virtual environment 400 that surrounds the user. The user can view different sections of the virtual environment 400 by turning their head.

Returning to FIG. 3, the access control device 102 generates the virtual environment 400 by converting the flagged web pages 120 into virtual objects 402 that the user can interact with. In one embodiment, the access control device 102 first identifies information associated with a flagged web page 120 from the user profile 116. The access control device 102 then accesses the flagged web page 120 using the stored address 128 for the flagged web page 120. The access control device 102 determines whether any filter settings 130 have been stored for the flagged web page 120. In response to determining that filter settings 130 have been stored for the flagged web page 120, the access control device 102 obtains the filter settings 130 from the user profile 116 and then applies the filter settings 130 to the flagged website 120 to customize the appearance of the flagged web page 120. The access control device 102 then determines whether any user inputs 132 have been stored for the flagged web page 120. In response to determining that user inputs 132 have been stored for the flagged web page 120, the access control device 102 obtains the user inputs 132 from the user profile 116, populates one or more data fields within the flagged web page 120 using their corresponding user inputs 132, and then applies the entered user inputs 132. After applying filter settings 130 and user inputs 132 to the flagged web page 120, the access control device 102 then captures a screenshot of at least a portion of the flagged web page 120. The captured screenshot is a virtual object 402 that can be embedded within the virtual environment 400. The access control device 102 then assigns the screenshot to a location within the virtual environment 400. The access control device 102 then associates a hyperlink with the screenshot which allows the user to access the flagged web page 120 in the state shown in the screenshot.

In some embodiments, the user profile 116 may further comprise user preferences 134 for how data is to be presented or visualized within the virtual environment 400. For example, the user preferences 134 may comprise instructions for arranging or scaling virtual objects within the virtual environment 400. In this case, the access control device 102 applies the user preferences 134 to the virtual objects 402 in the virtual environment 400.

At step 312, the access control device 102 provides access to the virtual environment 400 for the augmented reality device 104. The access control device 102 may provide access to the virtual environment 400 by sending data to the augmented reality device 104 that allows the user to view and interact with virtual objects 402 within the virtual environment 400.

After receiving access to the virtual environment 400, the user may use gestures (e.g. voice commands or hand gestures) to interact with the virtual objects 402 in the virtual environment 400. For example, providing access to the virtual environment 400 may allow the user to use gestures (e.g. voice command or hand gestures) to select a virtual object 402 to view. In this example, the augmented reality device 104 may detect a gesture performed by the user that identifies a virtual object 402 within the virtual environment 400. The augmented reality device 104 may then load and display the web page 120 that corresponds with the selected virtual object 402. The web page 120 is prepopulated with any filter settings 130 and user inputs 132 that the user previously applied. After loading the web page 120, the user may interact with the web page 120 when the filter settings 130 and user inputs 132 have been applied. This process allows the augmented reality device 104 to provide the web page 120 to the user in the same state that was captured when the web page 120 was flagged using the user device 106.

As another example, providing access to the virtual environment 400 may allow the user to use gestures to rearrange or reposition virtual objects 402 within the virtual environment 400. In this example, the augmented reality device 104 may detect hand gestures performed by the user that identifies a virtual object 402 and a new location for the virtual object. For example, the augmented reality device 104 may detect a hand gesture that corresponds with the user selecting a virtual object 402 and dragging the virtual object 402 to a new location within the virtual environment 400. The augmented reality device 104 may then reposition the identified virtual object 402 to the new location within the virtual environment 400 based on the detected hand gestures.

As another example, providing access to the virtual environment 400 may allow the user to use hand gestures to rescale virtual objects 402 within the virtual environment 400. In this example, the augmented reality device 104 may detect hand gestures performed by the user that identifies a virtual object 402 and a scale or size change for the virtual object 402. For instance, the user may pinch two fingers together to indicate a decrease in the size of the virtual object 402 or pull two fingers apart to indicate an increase in the size of the virtual object 402. The augmented reality device 104 may then rescale or resize the identified virtual object 402 based on the detected hand gestures. In other examples, the augmented reality device 104 may perform any other suitable type of action on virtual objects 402 within the virtual environment 400 based on detected gestures from the user.

Hardware Configuration for the Access Control Device

Figure 5:
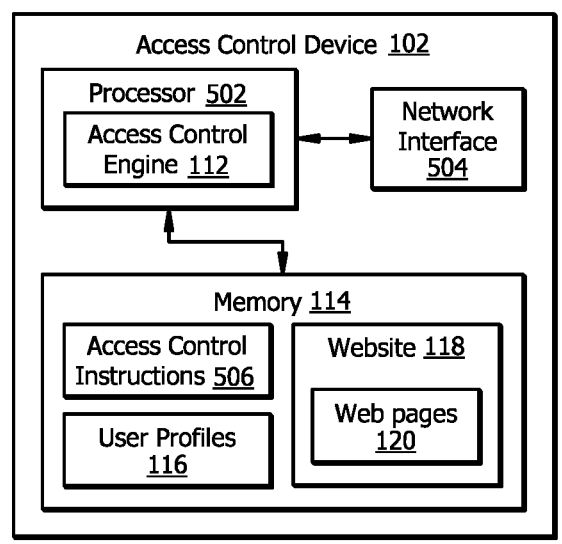
FIG. 5 is an embodiment of an access control device for the information system.

FIG. 5 is an embodiment of an access control device 102 for the information system 100. As an example, the access control device 102 may be a server or a computer. The access control device 102 comprises a processor 502, a memory 114, and a network interface 504. The access control device 102 may be configured as shown or in any other suitable configuration.

Processor

The processor 502 is a hardware device that comprises one or more processors operably coupled to the memory 114. The processor 502 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 114 and the network interface 504. The one or more processors are configured to process data and may be implemented in hardware or software. For example, the processor 502 may be 8-bit, 16-bit, 32-bit, 64-bit, or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute access control instructions 506 to implement the access control engine 112. In this way, processor 502 may be a special-purpose computer designed to implement the functions disclosed herein. In an embodiment, the access control engine 112 is implemented using logic units, FPGAs, ASICs, DSPs, or any other suitable hardware. The access control engine 112 is configured to operate as described in FIGS. 1-3. For example, the access control engine 112 may be configured to perform the steps of process 200 and 300 as described in FIGS. 2 and 3, respectively.

Memory

The memory 114 is a hardware device that is operable to store any of the information described above with respect to FIGS. 1-3 along with any other data, instructions, logic, rules, or code operable to implement the function(s) described herein when executed by the processor 502. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store access control instructions 506, user profiles 116, websites 118, web pages 120, and/or any other data or instructions. The access control instructions 506 may comprise any suitable set of instructions, logic, rules, or code operable to execute the access control engine 112. The user profiles 116, the websites 118, and the web pages 120 are configured similar to the user profiles 116, the websites 118, and the web pages 120 described in FIGS. 1-3, respectively.

Network Interface

The network interface 504 is a hardware device that is configured to enable wired and/or wireless communications. The network interface 504 is configured to communicate data between user devices (e.g. augmented reality device 104 and user device 106) and other devices, systems, or domains. For example, the network interface 504 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 502 is configured to send and receive data using the network interface 504. The network interface 504 may be configured to use any suitable type of communication protocol as would be appreciated by one of ordinary skill in the art.

Augmented Reality Device Hardware Configuration

Figure 6:
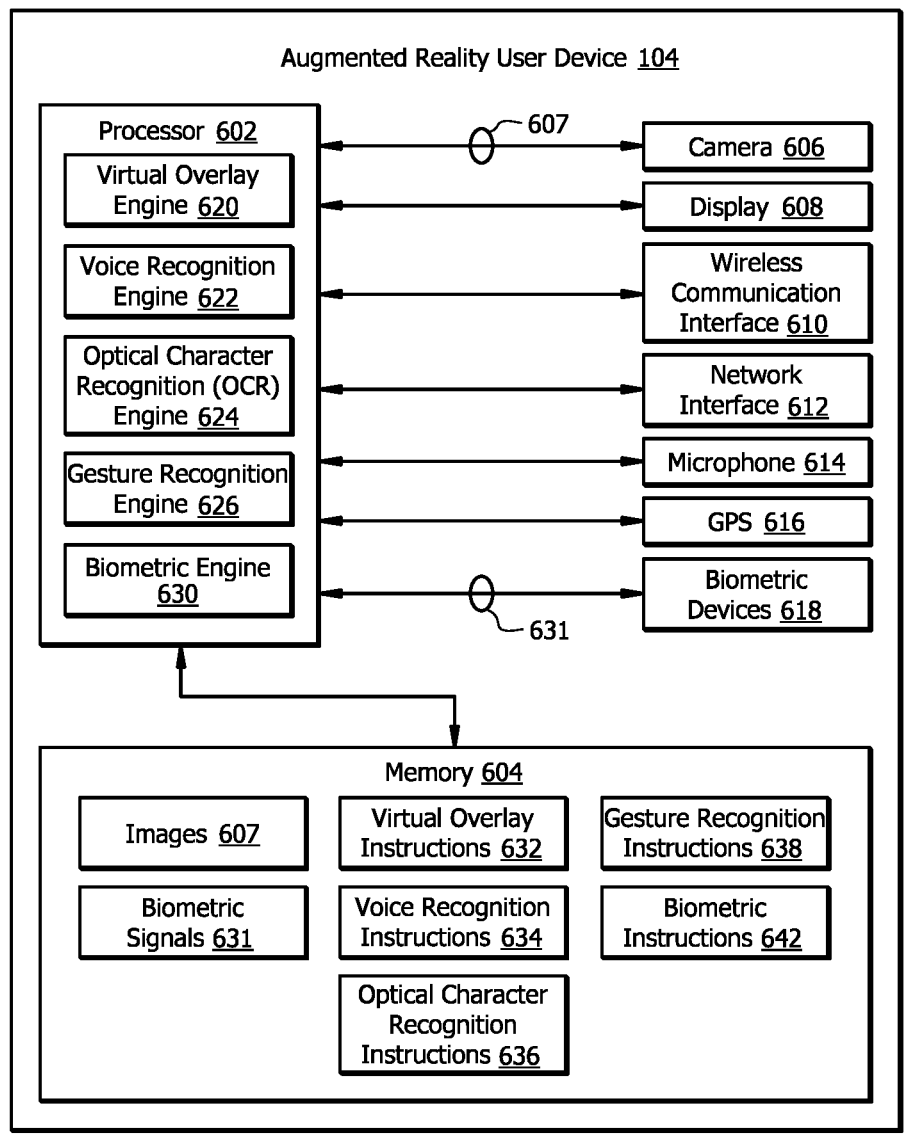
FIG. 6 is an embodiment of an augmented reality device for accessing the information system.

FIG. 6 is a schematic diagram of an embodiment of an augmented reality device 104 for accessing the information system 100. The augmented reality device 104 is configured to display a virtual environment 400 that comprises virtual objects 402 overlaid onto one or more tangible objects in a real scene.

The augmented reality device 104 comprises a processor 602, a memory 604, a camera 606, a display 608, a wireless communication interface 610, a network interface 612, a microphone 614, a global position system (GPS) sensor 616, and one or more biometric devices 618. The augmented reality device 104 may be configured as shown or in any other suitable configuration. For example, augmented reality device 104 may comprise one or more additional components and/or one or more shown components may be omitted.

Camera

Examples of the camera 606 include, but are not limited to, charge-coupled device (CCD) cameras and complementary metal-oxide semiconductor (CMOS) cameras. The camera 606 is configured to capture images 607 of people, text, and objects within a real environment. The camera 606 is a hardware device that is configured to capture images 607 continuously, at predetermined intervals, or on-demand. For example, the camera 606 is configured to receive a command from a user to capture an image 607. In another example, the camera 606 is configured to continuously capture images 607 to form a video stream of images 607. The camera 606 is operable coupled to an optical character (OCR) recognition engine 624 and/or the gesture recognition engine 626 and provides images 607 to the OCR recognition engine 624 and/or the gesture recognition engine 626 for processing, for example, to identify gestures, text, and/or objects in front of the user.

Display

The display 608 is a hardware device that is configured to present visual information to a user in an augmented reality environment that overlays virtual or graphical objects onto tangible objects in a real scene in real-time. In an embodiment, the display 608 is a wearable optical head-mounted display configured to reflect projected images and allows a user to see through the display. For example, the display 608 may comprise display units, lens, semi-transparent mirrors embedded in an eyeglass structure, a visor structure, or a helmet structure. Examples of display units include, but are not limited to, a cathode ray tube (CRT) display, a liquid crystal display (LCD), a liquid crystal on silicon (LCOS) display, a light-emitting diode (LED) display, an active-matrix OLED (AMOLED), an organic LED (OLED) display, a projector display, or any other suitable type of display as would be appreciated by one of ordinary skill in the art upon viewing this disclosure. In another embodiment, the display 608 is a graphical display on a user device. For example, the graphical display may be the display of a tablet or smartphone configured to display an augmented reality environment with virtual or graphical objects 402 overlaid onto tangible objects in a real scene in real-time.

Wireless Communication Interface

Examples of the wireless communication interface 610 include, but are not limited to, a Bluetooth interface, a radio frequency identifier (RFID) interface, a near-field communication (NFC) interface, a LAN interface, a PAN interface, a WAN interface, a Wi-Fi interface, a ZigBee interface, or any other suitable wireless communication interface as would be appreciated by one of ordinary skill in the art upon viewing this disclosure. The wireless communication interface 610 is a hardware device that is configured to allow the processor 602 to communicate with other devices. For example, the wireless communication interface 610 is configured to allow the processor 602 to send and receive signals with other devices for the user (e.g. a mobile phone) and/or with devices for other people. The wireless communication interface 610 is configured to employ any suitable communication protocol.

Network Interface

The network interface 612 is a hardware device that is configured to enable wired and/or wireless communications and to communicate data through a network, system, and/or domain. For example, the network interface 612 is configured for communication with a modem, a switch, a router, a bridge, a server, or a client. The processor 602 is configured to receive data using network interface 612 from a network or a remote source.

Microphone

Microphone 614 is a hardware device configured to capture audio signals (e.g. voice commands) from a user and/or other people near the user. The microphone 614 is configured to capture audio signals continuously, at predetermined intervals, or on-demand. The microphone 614 is operably coupled to the voice recognition engine 622 and provides captured audio signals to the voice recognition engine 622 for processing, for example, to identify a voice command from the user.

GPS Sensor

The GPS sensor 616 is a hardware device that is configured to capture and to provide geographical location information. For example, the GPS sensor 616 is configured to provide the geographic location of a user employing the augmented reality device 104. The GPS sensor 616 is configured to provide the geographic location information as a relative geographic location or an absolute geographic location. The GPS sensor 616 provides the geographic location information using geographic coordinates (i.e. longitude and latitude) or any other suitable coordinate system.

Biometric Devices

Examples of biometric devices 618 include, but are not limited to, retina scanners and finger print scanners. Biometric devices 618 are hardware devices that are configured to capture information about a person's physical characteristics and to output a biometric signal 631 based on captured information. A biometric signal 631 is a signal that is uniquely linked to a person based on their physical characteristics. For example, a biometric device 618 may be configured to perform a retinal scan of the user's eye and to generate a biometric signal 631 for the user based on the retinal scan. As another example, a biometric device 618 is configured to perform a fingerprint scan of the user's finger and to generate a biometric signal 631 for the user based on the fingerprint scan. The biometric signal 631 is used by a biometric engine 630 to identify and/or authenticate a person.

Processor

The processor 602 is a hardware device that is implemented as one or more CPU chips, logic units, cores (e.g. a multi-core processor), FPGAs, ASICs, or DSPs. The processor 602 is communicatively coupled to and in signal communication with the memory 604, the camera 606, the display 608, the wireless communication interface 610, the network interface 612, the microphone 614, the GPS sensor 616, and the biometric devices 618. The processor 602 is configured to receive and transmit electrical signals among one or more of the memory 604, the camera 606, the display 608, the wireless communication interface 610, the network interface 612, the microphone 614, the GPS sensor 616, and the biometric devices 618. The electrical signals are used to send and receive data and/or to control or communicate with other devices. For example, the processor 602 transmits electrical signals to operate the camera 606. The processor 602 may be operably coupled to one or more other devices (not shown).

The processor 602 is configured to process data and may be configured to implement various instructions. For example, the processor 602 is configured to implement a virtual overlay engine 620, a voice recognition engine 622, an OCR recognition engine 624, a gesture recognition engine 626, and a biometric engine 630. In an embodiment, the virtual overlay engine 620, the voice recognition engine 622, the OCR recognition engine 624, the gesture recognition engine 626, and the biometric engine 630 are implemented using logic units, FPGAs, ASICs, DSPs, or any other suitable hardware.

The virtual overlay engine 620 is configured to overlay virtual objects onto tangible objects in a real scene using the display 608. For example, the display 608 may be a head-mounted display that allows a user to simultaneously view tangible objects in a real scene and virtual objects. The virtual overlay engine 620 is configured to process data to be presented to a user as an augmented reality virtual object on the display 608. An example of overlay virtual objects onto tangible objects in a virtual environment 400 is shown in FIG. 4.

The voice recognition engine 622 is configured to capture and/or identify voice patterns using the microphone 614. For example, the voice recognition engine 622 is configured to capture a voice signal from a person and to compare the captured voice signal to known voice patterns or commands to identify the person and/or commands provided by the person. For instance, the voice recognition engine 622 is configured to receive a voice signal to authenticate a user and/or to identify a selected option or an action indicated by the user.

The OCR recognition engine 624 is configured to identify objects, object features, text, and/or logos using images 607 or video streams created from a series of images 607. In one embodiment, the OCR recognition engine 624 is configured to identify objects and/or text within an image 607 captured by the camera 606. In another embodiment, the OCR recognition engine 624 is configured to identify objects and/or text in about real-time on a video stream captured by the camera 606 when the camera 606 is configured to continuously capture images 607. The OCR recognition engine 624 employs any suitable technique for implementing object and/or text recognition.

The gesture recognition engine 626 is configured to identify gestures performed by a user and/or other people. Examples of gestures include, but are not limited to, hand movements, hand positions, finger movements, head movements, and/or any other actions that provide a visual signal from a person. For example, gesture recognition engine 626 is configured to identify hand gestures provided by a user to indicate various commands such as a command to initiate a request for an augmented reality overlay for a document. The gesture recognition engine 626 employs any suitable technique for implementing gesture recognition.

The biometric engine 630 is configured to identify a person based on a biometric signal 631 generated from the person's physical characteristics. The biometric engine 630 employs one or more biometric devices 618 to identify a user based on one or more biometric signals 631. For example, the biometric engine 630 receives a biometric signal 631 from the biometric device 618 in response to a retinal scan of the user's eye and/or a fingerprint scan of the user's finger. The biometric engine 630 compares biometric signals 631 from the biometric device 618 to previously-stored biometric signals 631 for the user to authenticate the user. The biometric engine 630 authenticates the user when the biometric signals 631 from the biometric devices 618 substantially matches (e.g. is the same as) the previously stored biometric signals 631 for the user.

Memory

The memory 604 is a hardware device that comprises one or more disks, tape drives, or solid-state drives, and may be used as an over-flow data storage device, to store programs when such programs are selected for execution, and to store instructions and data that are read during program execution. The memory 604 may be volatile or non-volatile and may comprise ROM, RAM, TCAM, DRAM, and SRAM. The memory 604 is operable to store images 607, virtual overlay instructions 632, voice recognition instructions 634, OCR recognition instructions 636, gesture recognition instructions 638, biometric instructions 642, and any other data or instructions.

Images 607 comprises images captured by the camera 606 and images 607 from other sources. In one embodiment, images 607 comprises images used by the augmented reality device 104 when performing optical character recognition. Images 607 can be captured using camera 606 or downloaded from another source such as a flash memory device or a remote server via an Internet connection.

Biometric signals 631 are signals or data that are generated by a biometric device 618 based on a person's physical characteristics. Biometric signals 631 are used by the augmented reality device 104 to identify and/or authenticate an augmented reality device 104 user by comparing biometric signals 631 captured by the biometric devices 618 with previously stored biometric signals 631.

The virtual overlay instructions 632, the voice recognition instructions 634, the OCR recognition instructions 636, the gesture recognition instructions 638, and the biometric instructions 642 each comprise any suitable set of instructions, logic, rules, or code operable to execute the virtual overlay engine 620, the voice recognition engine 622, the OCR recognition engine 624, the gesture recognition engine 626, and the biometric engine 630, respectively.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An access control device, comprising:
a memory operable to store:
user profiles identifying approved users for accessing websites within a network, wherein each user is associated with user credentials; and
a processor operably coupled to the memory, configured to:
receive an access request for a website from an augmented reality device, wherein:
the website comprises a plurality of web pages;
the augmented reality device is configured to overlay virtual objects onto tangle objects in a real-world environment; and
the access request comprises first user credentials;
determine a user associated with the augmented reality device is authorized to access the website based on the first user credentials;
identify a user profile for the user associated with the first user credentials;
identify information for one or more flagged web pages associated with the website within the user profile, wherein the information comprises:
an address for each flagged web page; and
filter settings for each flagged web page, wherein the filter settings comprise a setting to customize an appearance of the flagged web page;
generate a virtual environment comprising a plurality of virtual objects based on the information for the one or more flagged web pages, wherein generating the virtual environment comprises:
accessing a first flagged web page at a first address associated with the first flagged web page;
applying a first filter setting to the first flagged web page based on a filter setting associated with the first flagged web page;
capturing a screenshot of at least a portion of the first flagged web page;
assigning the screenshot to a location within the virtual environment as a virtual object; and
associating a hyperlink to the first address with the screenshot; and
provide access to the virtual environment for the augmented reality device.

2. The device of claim 1, wherein:
the information for the one or more flagged web pages comprises user inputs for the first flagged web page; and
generating the virtual environment further comprises:
populating one or more data fields in the first flagged web page with user inputs; and
applying the user inputs before capturing the screenshot of the at least a portion of the first flagged web page.

3. The device of claim 1, wherein generating the virtual environment further comprises:
identifying user preferences in the user profile for the augmented reality device, wherein the user preferences comprise setting for visualizing virtual objects within the virtual environment; and
applying the user preferences when providing access to the virtual environment for the augmented reality device, wherein applying the user preferences scales a size for one or more virtual objects within the virtual environment.

4. The device of claim 1, wherein providing access to the virtual environment for the augmented reality device allows the user to rescale virtual objects in the virtual environment using hand gestures.

5. The device of claim 1, wherein providing access to the virtual environment for the augmented reality device allows the user to reposition virtual objects in the virtual environment using hand gestures.

6. The device of claim 1, wherein the processor is further configured to:
receive an access request for accessing the website from a user device, wherein the access request comprises a second user credentials;
determine the user associated with the user device is authorized to access the website based on the second user credentials;
identify the user profile for the user associated with the second user credentials;
provide access to the website for the user device;
receive a flag request for a first web page from among the plurality of web pages;
identify an address for the first web page;
identify filter settings for the first web page; and
store the address and the filter settings for the first web page in the user profile for the user.

7. The device of claim 6, wherein user device is a mobile device.

8. A data access control method, comprising:
receiving an access request for a website from an augmented reality device, wherein:
the website comprises a plurality of web pages;
the augmented reality device is configured to overlay virtual objects onto tangle objects in a real-world environment; and
the access request comprises first user credentials;
determining a user associated with the augmented reality device is authorized to access the website based on the first user credentials;

identifying a user profile for the user associated with the first user credentials;
identifying information for one or more flagged web pages associated with the website within the user profile, wherein the information comprises:
an address for each flagged web page; and
filter settings for each flagged web page, wherein the filter settings comprise a setting to customize an appearance of the flagged web page;
generating a virtual environment comprising a plurality of virtual objects based on the information for the one or more flagged web pages, wherein generating the virtual environment comprises:
accessing a first flagged web page at a first address associated with the first flagged web page;
applying a first filter setting to the first flagged web page based on a filter setting associated with the first flagged web page;
capturing a screenshot of at least a portion of the first flagged web page;
assigning the screenshot to a location within the virtual environment as a virtual object; and
associating a hyperlink to the first address with the screenshot; and
providing access to the virtual environment for the augmented reality device.

9. The method of claim 8, wherein:
the information for the one or more flagged web pages comprises user inputs for the first flagged web page; and
generating the virtual environment further comprises:
populating one or more data fields in the first flagged web page with user inputs; and
applying the user inputs before capturing the screenshot of the at least a portion of the first flagged web page.

10. The method of claim 8, wherein generating the virtual environment further comprises:
identifying user preferences in the user profile for the augmented reality device, wherein the user preferences comprise setting for visualizing virtual objects within the virtual environment; and
applying the user preferences when providing access to the virtual environment for the augmented reality device, wherein applying the user preferences scales a size for one or more virtual objects within the virtual environment.

11. The method of claim 8, wherein providing access to the virtual environment for the augmented reality device allows the user to rescale virtual objects in the virtual environment using hand gestures.

12. The method of claim 8, wherein providing access to the virtual environment for the augmented reality device allows the user to reposition virtual objects in the virtual environment using hand gestures.

13. The method of claim 8, further comprising:
receiving an access request for accessing the website from a user device, wherein the access request comprises a second user credentials;
determining the user associated with the user device is authorized to access the website based on the second user credentials;
identifying the user profile for the user associated with the second user credentials;
providing access to the website for the user device;
receiving a flag request for a first web page from among the plurality of web pages;
identifying an address for the first web page;
identifying filter settings for the first web page; and
storing the address and the filter settings for the first web page in the user profile for the user.

14. The method of claim 13, wherein user device is a mobile device.

15. A computer program product comprising executable instructions stored in a non-transitory computer-readable medium that when executed by a processor causes the processor to:
receive an access request for a website from an augmented reality device, wherein:
the website comprises a plurality of web pages;
the augmented reality device is configured to overlay virtual objects onto tangle objects in a real-world environment; and
the access request comprises first user credentials;
determine a user associated with the augmented reality device is authorized to access the website based on the first user credentials;
identify a user profile for the user associated with the first user credentials;
identify information for one or more flagged web pages associated with the website within the user profile, wherein the information comprises:
an address for each flagged web page; and
filter settings for each flagged web page, wherein the filter settings comprise a setting to customize an appearance of the flagged web page;
generate a virtual environment comprising a plurality of virtual objects based on the information for the one or more flagged web pages, wherein generating the virtual environment comprises:
accessing a first flagged web page at a first address associated with the first flagged web page;
applying a first filter setting to the first flagged web page based on filter setting associated with the first flagged web page;
capturing a screenshot of at least a portion of the first flagged web page;
assigning the screenshot to a location within the virtual environment as a virtual object; and
associating a hyperlink to the first address with the screenshot; and
provide access to the virtual environment for the augmented reality device.

16. The computer program product of claim 15, wherein:
the information for the one or more flagged web pages comprises user inputs for the first flagged web page; and
generating the virtual environment further comprises:
populating one or more data fields in the first flagged web page with user inputs; and
applying the user inputs before capturing the screenshot of the at least a portion of the first flagged web page.

17. The computer program product of claim 15, wherein generating the virtual environment further comprises:
identifying user preferences in the user profile for the augmented reality device, wherein the user preferences comprise setting for visualizing virtual objects within the virtual environment; and
applying the user preferences when providing access to the virtual environment for the augmented reality device, wherein applying the user preferences scales a size for one or more virtual objects within the virtual environment.

18. The computer program product of claim 15, wherein providing access to the virtual environment for the augmented reality device allows the user to rescale virtual objects in the virtual environment using hand gestures.

19. The computer program product of claim 15, wherein providing access to the virtual environment for the augmented reality device allows the user to reposition virtual objects in the virtual environment using hand gestures.

20. The computer program product of claim 15, further comprising instructions that when executed by the processor cause the processor to:
   receive an access request for accessing the website from a user device, wherein the access request comprises a second user credentials;
   determine the user associated with the user device is authorized to access the website based on the second user credentials;
   identify the user profile for the user associated with the second user credentials;
   provide access to the website for the user device;
   receive a flag request for a first web page from among the plurality of web pages;
   identify an address for the first web page;
   identify filter settings for the first web page; and
   store the address and the filter settings for the first web page in the user profile for the user.

* * * * *